March 13, 1951 G. BRIGGS 2,545,223
SERVO-MECHANISM AND CONTROL MEANS THEREFOR
Filed Nov. 8, 1948
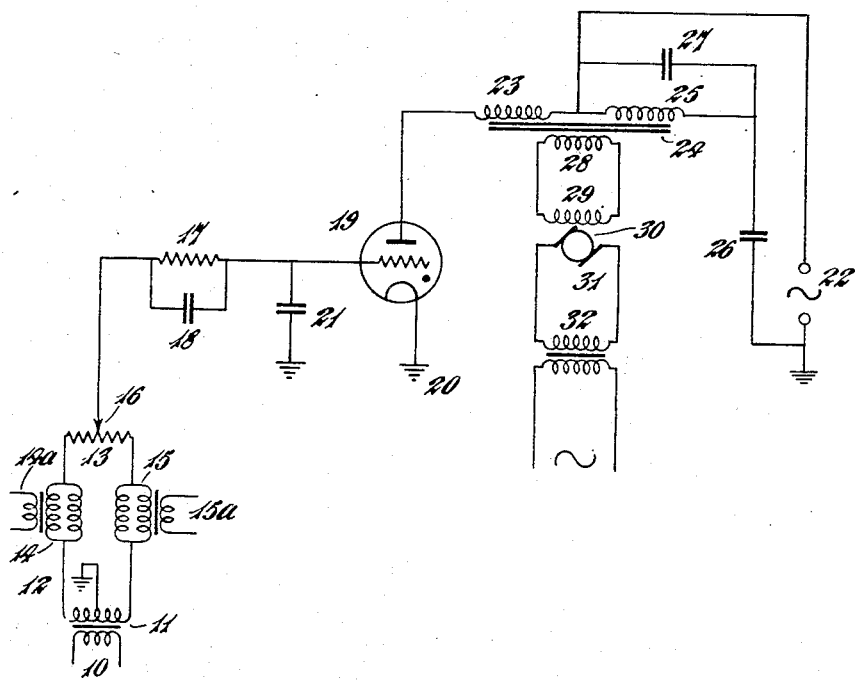
INVENTOR:
GEORGE BRIGGS
By
Richardson, David and Nordon
Attys Patented Mar. 13, 1951

2,545,223

UNITED STATES PATENT OFFICE 2,545,223

SERVO MECHANISM AND CONTROL MEANS THEREFOR

George Briggs, London, England

Application November 8, 1948, Serial No. 58,950
In Great Britain September 29, 1947

2 Claims. (Cl. 318—207)

This invention relates to servo-mechanisms and more particularly servo-mechanisms such as are used in remote position indicators and other devices of the kind in which the control means operate under the combined influence of a misalignment signal and a counter-balancing feedback signal, usually in phase opposition to the misalignment signal, the magnitude and sense of the misalignment signal depending upon the degree of misalignment of the controlling and controlled elements of the system and the magnitude and sense of the balancing or feed-back signal depending upon the position of the controlled element. The chief object of the present invention is to provide very simple, cheap and efficient electronically controlled servo-mechanism. Further objects of the present invention will be referred to hereinafter.

According to the present invention servomechanism in which the controlled and control elements operate from a single A. C. source, or from A. C. sources of the same frequency, comprises a single phase A. C. motor having one or other of its windings connected to the A. C. source as the controlled element, a transformer having oppositely wound primary windings and a secondary winding feeding the other winding of the motor, one of said primary windings being connected across the A. C. source in series with a condenser to advance the phase of the current flowing therein and the other primary winding being connected in the anode circuit of a gridcontrolled gas-filled half-wave rectifier (hereinafter referred to for the sake of brevity as a "Thyratron") the anode of which is supplied with A. C. from the said source, means being provided for varying the magnitude and/or phase of the potential applied to the grid of the Thyratron relative to the anode voltage thereon in order to vary the magnitude and phase of the current of source frequency flowing in the second-mentioned primary winding.

Conveniently a sub-harmonic of the source frequency is generated when the magnitude of the in-phase component of the source frequency current in the secondary winding is at or near zero and the sub-harmonic current is used to enable the motor to give a positive alternating torque at zero conditions.

As applied to servo-mechanisms such as are used in remote position indicators and other devices of the kind above set forth the control means according to the present invention comprise a separately excited, wound armature motor, the armature of which is supplied with A. C. and the field of which is connected in the secondary circuit of a transformer having two primary windings wound in opposite directions, one primary winding being connected across a source of A. C. in series with a condenser to advance the phase of the current flowing therein, and the other primary winding also being connected at one end to the said source of A. C. and being included in the anode circuit of a Thyratron type valve, means being provided for automatically varying the magnitude and/or phase of the voltage applied to the grid of the Thyratron relative to the phase of the anode voltage proportionately to the magnitude and sense of the misalignment signal, and means being provided for automatically varying the magnitude and/or phase of the voltage applied to the grid of the Thyratron proportionately to the magnitude and sense of the balancing or feedback signal in the inverse sense to the automatic variation of voltage caused by the misalignment signal.

It is convenient to secure the desired control by the application of an A. C. voltage to the grid of the Thyratron in which case the phase of the A. C. voltage applied to the grid relative to the phase of the anode voltage is automatically shifted proportionately to the magnitude and sense of the misalignment signal and means are provided for automatically shifting the phase of the A. C. voltage applied to the grid of the Thyratron proportionately to the magnitude and sense of the balancing or feed back signal in the inverse sense to the automatic shifting of phase caused by the misalignment signal.

Preferably the A. C. voltage is applied to the grid of the Thyratron from a point on a potentiometer connected across the secondary of a transformer the primary of which is supplied with A. C. current of the same frequency as the anode supply, the secondary of said transformer being centre-tapped to set up a bridge circuit, means being provided for automatically varying the reactance of one arm of the bridge proportionately to the magnitude and sense of the misalignment signal and for automatically varying the reactance of the other arm of the bridge proportionately to the magnitude and sense of the balancing or feed-back signal.

It is convenient to vary the reactance of the arms of the bridge with the aid of saturable reactors as will be described more fully hereinafter.

Certain other novel features of arrangement and operation are provided by the present invention these being more fully described hereinafter.

In order that this invention may be the more clearly understood and readily carried into effect reference may be made to the accompanying drawing which is a circuit diagram of the preferred form of control means for servo-mechanism such as remote position indicators of the kind above set forth.

Referring now to the accompanying drawing, the control means, which are particularly applicable to follow-up servo-mechanisms such as remote position indicators and other devices of the kind above set forth, therein illustrated comprise a transformer, the primary 10 of which is fed with A. C. of a suitable frequency which is hereinafter referred to as the "given frequency." The secondary 11 of this transformer is centre-tapped to earth as at 12. The secondary 11 is connected in a bridge circuit with a potentiometer 13 and the A. C. windings 14 and 15 of two saturable reactors are included in the leads from the secondary 11 to the potentiometer 13 so as to lie one in each half of the bridge.

The function of the saturable reactors and the bridge circuit will be described hereinafter.

The slider 16 of the potentiometer 13 is connected through a grid leak 17 and parallel condenser 18 to the grid of a Thyratron type valve 19, the cathode of which is earthed as at 20. A condenser 21 is connected between the grid of the Thyratron and earth. The anode of the Thyratron is supplied with A. C. of the given frequency from a source 22. Included in the anode circuit of the Thyratron is one primary winding 23 of a transformer 24 the other primary 25 of which is wound in the opposite sense to the primary 23 and is connected across the A. C. source 22 through a series condenser 26. The condenser 26 forms one of the most important features of the present invention. A parallel condenser 27 may be connected across the second primary winding 25.

The secondary 28 of the transformer 24 is connected across the field winding 29 of a separately excited, wound armature motor 30, the armature 31 of the motor being fed with A. C., through a transformer 32.

Let us now consider the operation of the motor driving circuit.

When the Thyratron is not firing, the phase of the wave-form in 28 is that of 25, which is practically in phase with the supply (if anything slightly lagging). The effect of condenser 27 in this case is negligible. This therefore is the limiting case in one direction.

When the Thyratron starts to fire, several contributory effects occur:

(1) The current drawn by the Thyratron causes partial saturation which reduces the effective inductance of 25, increases the current through condenser 27, and thus advances the phase of the voltage in 25.

(2) During the time the Thyratron is firing, there is coupling from 25 to 23 in antiphase, which effectively retards the phase of the voltage in 23, and therefore keeps the Thyratron firing over what is in effect a distorted half cycle.

(3) This will in turn maintain the saturation of the core and induce in 25 a pulse which is in antiphase relative to the current pulse in 23, and practically in phase with the advanced voltage in 25. The result of the inductive kick from the collapse of the Thyratron in 23, and the increasing self-inductance of 25, will be such as to maintain in reasonably sinusoidal form the advanced phase in 25 over the whole cycle. This advanced phase voltage appears in 28, so as to drive the motor.

(4) As the firing of the Thyratron is initiated earlier, the initial saturation current becomes greater, the inductance of 25 is lowered still more and the phase of voltage in 25 is advanced still further. The process as in (3) is thus repeated but which phase of ultimate voltage in 25 still further advanced until when the Thyratron firing is initiated at 0° the phase of the voltage in 23 is tending towards antiphase relative to the initial phase when the Thyratron is not firing.

(5) The extent of phase change obtained will depend to some extent on the turns relationship of the two windings, but the winding 25 should have a greater number of turns than 23 so that the driving voltage when the Thyratron is not firing should maintain a reasonable amplitude in comparison with the time when the Thyratron is firing, and the inductance of 25 is lowered, but the signal is reinforced with the signal induced from 23. The overall turns and core size should be such as to satisfy the variable saturation conditions caused by the extent of current flowing in 23.

(6) The ultimate effect of the combination is that of a driving voltage induced from 25 to 28, the phase of which depends on the saturation of the core and the consequent reduction of effective inductance of 25 and increased current through 27, the degree of saturation and consequently the angular advance of the voltage in 25, being initiated by the point on the cycle in 23 at which the Thyratron commences to fire. The ironing out of discontinuities and the maintenance of a reasonably sinusoidal waveform, is brought about by the inductance of the windings and the filtering effect of the motor load. The phase change obviously controls motor direction and speed.

In the present invention the Thyratron does not contribute directly to the motor driving current, but in effect acts as a controlled switching device to alter the phase of the driving voltage obtained from 25.

All we have to do, therefore, to provide the desired control of speed and direction of the motor 30 (which is, of course, adapted to drive the controlled element of the remote position indicator or other device in any desired way) is to vary the current flowing in the primary 23. It has been shown above that the current flowing in the primary 23 may be controlled by varying the phase of the A. C. grid voltage relative to the anode voltage. The most convenient way of doing this is to vary the reactance of one or both of the arms of the bridge. The saturable reactors 14 and 15 provide very convenient means of carrying out variations in the reactance of the arms of the bridge by small variations of D. C. current flowing in their D. C. windings 14a and 15a. It is a known property of saturable reactors that small changes in the D. C. current flowing through their D. C. windings cause large and corresponding variations in the reactance of the A. C. windings.

In order, therefore, to secure the desired automatic control of the motor we cause the D. C. current flowing in the D. C. winding 14a of the saturable reactor 14a, 14 to vary about a given value directly proportionately to the magnitude and sense of the misalignment signal. In other words, let us say, if the misalignment is to the right the D. C. current is increased whilst, if it is to the left, the D. C. current in the winding 14a is decreased and in both cases the magnitude of the change is directly proportionate to the degree of misalignment. There are many ways in which the misalignment signal may be caused to change the D. C. current flowing in the winding 14a and any such means may be employed without departing from the scope of the present invention. The misalignment signal is, of course, obtained from the controlling element of the system and, in the case of an automatic pilot is obtained from the compass through the course setter.

In a like manner the D. C. current flowing through the D. C. winding of the saturable reactor 15, 15a is caused to vary about a mean value in a manner which is directly proportionate to the magnitude and sense of the balancing signal. In the case of an automatic pilot the balancing signal will depend in sense as to whether the rudder has been turned to the left or to the right and in magnitude as to the degree of displacement. Any suitable means for producing this balancing signal may be employed without departing from the scope of the present invention, for example, a potentiometer the contact of which is driven to one side or the other of a centre null-point by movement of the rudder. It should be pointed out that in this case also any suitable means may be employed for converting the balancing signal into the desired variation of the D. C. current in the winding 15a, as was the case with the misalignment signal.

Let us now assume that a misalignment signal is transmitted by the system to cause a variation in the D. C. current flowing through the winding 14a. According to whether the D. C. current is increased or decreased the reactance of the A. C. winding 14 will be decreased or increased proportionately to the magnitude of the change and this will shift the phase of the A. C. voltage transmitted to the grid of the Thyratron and so will cause the desired rise or fall in the current flowing through the primary 23.

The motor 30 will accordingly be driven in one direction or the other to turn the rudder to left or to right, as the case may be. As soon as the rudder is turned a balancing signal will be transmitted back to the winding 15a of the saturable reactor 15, 15a the connections of which are such that if the misalignment signal caused a decrease in the reactance of the A. C. winding 14 then the balancing signal transmitted back to the D. C. winding 15a will cause a decrease in the reactance of the A. C. winding 15. Variation of the reactance of the A. C. winding 15 in the same sense as the variation of the reactance of the A. C. winding 14 will tend to rebalance the bridge and it will be seen that when the effect of the balancing signal has completely re-balanced the bridge then the steady state conditions will be reestablished as far as the Thyratron is concerned. The currents flowing in the secondary 28 will substantially balance out in their effect on the motor which will no longer be driven in any one direction. By the use of suitable sensitivity controls it is possible to adjust the maximum swing of the rudder i. e. the tightness of steering. As soon as the turning of the rudder takes effect to bring the craft on to the desired course it will be appreciated that the misalignment signal will decrease. The result is that the reactance of the A. C. winding 14 will increase, the balance of the bridge will be thrown out in the opposite direction to what it was initially and the phase of the A. C. voltage on the grid of the Thyratron will shift in the opposite direction so that the motor will now be driven in the reverse direction as will be understood from the above explanation. Consequently a new balance position will be established by the rudder being turned back slightly. It will be seen that the craft will be eased back on to course and that when it is on course the misalignment signal will disappear, as will the balancing signal, and the apparatus remains quiescent ready to take over should the craft move off course or when it is desired to change course whereupon the misalignment signal will reappear.

We can now turn to a consideration of the effect of the large first harmonic component which exists in the secondary current. Since the primary 23 is tightly coupled to the primary 25 there will be an E. M. F. of first harmonic frequency generated in the primary 25, and when the Thyratron pulse ceases so that the damping is removed, the decay factor in the primary 25 combined with the condenser 27 will determine the rate at which this current dies out.

Thus the first harmonic E. M. F. in the primary 25 and applied in anti-phase to the primary 23 has an appreciable magnitude. The E. M. F. applied to the anode of the Thyratron is the resultant of this first harmonic E. M. F. and the source voltage. By a slight phase shift of one component the resultant may have a lesser value than the source voltage one-fiftieth of a second after the Thyratron has struck and since the original voltage was only just sufficient to cause the Thyratron to fire the small phase shift engendered by the above harmonic will prevent the Thyratron firing. Hence the Thyratron will only fire on every other cycle and the current will then contain a 25 cycle component, substantially equal to the fifty cycle component, and a slightly reduced seventy-five and hundred cycle component.

The other harmonic components will also play a part in this effect and it may be possible by reducing the loss in the transformer that the decay will be sufficiently slow to cause the Thyratron to miss two, or even more, cycles.

The effect of the 25 cycle wave generated is to maintain the rotor in a state of vibration at the zero position which thus renders it much more sensitive to changes in magnitude and sense of the in-phase component of the field current. This backwards and forward dither of the rotor of the motor has very considerable advantages in many applications, and it can be arranged to cause the rotor of the motor to have a substantial alternating torque. On the other hand there may be conditions, where this dither is undesirable and it will be found that whether the dither is present or not will depend upon the phase of the grid voltage relative to the phase of the anode voltage on the balance or steady state position.

The presence of the dither is of particular advantage in automatic pilots since it will overcome the inertia of the motor and its associated parts and generally overcome the disadvantages of stiction. Heretofore very complicated means have been employed to introduce this small, but definite, dither into the system so that the motor will take over immediately a small misalignment signal appears, but it will be seen that with the apparatus according to the present invention the dither can be introduced merely by suitable adjustment of the phase of the grid relative to the phase of the anode voltage and without the need of providing any apparatus other than that which is provided for driving the motor and controlling its direction and speed.

Not only are the advantages of overcoming stiction secured by the introduction of the twenty-five cycle component into the motor field, in addition this will have a further very great advantage in that it will tend to prevent the motor over-running. Here again, very complicated networks and so forth have heretofore been provided for preventing the motor over-running, but it will be seen that as the motor tends to come to its zero position the twenty-five cycle will come into play and will hold the motor and make it substantially dead beat.

The back E. M. F. of the making and breaking of the current at the commutator will also enhance this dither and render it more positive due to its reaction on the voltage applied to the anode of the Thyratron.

In a modified embodiment of the present invention the connections of the motor 30 are reversed, the armature being connected to the secondary winding of the transformer and the field to the source of A. C.

In carrying out the present invention it is preferred to use a separately excited wound armature type of motor but this is by no means essential since similar results can be obtained by the use of a two-phase induction motor, one phase being fed by the secondary of the transformer and the other phase by the A. C.

In all cases one or more phase-correcting condensers may be provided in one or other of the motor circuits.

I claim:

1. Servo-mechanism including a motor of the kind having at least two windings and also having a rotor so designed and arranged as to rotate in opposite directions when the phase of an alternating current supplied to one of said windings is changed from a leading to a lagging aspect with respect to the phase of an alternating current flowing in the other of said windings, one of said windings being connected directly to a source of alternating current of a given frequency, a transformer having oppositely wound and coupled primary windings, and a secondary winding coupled to both primary windings, said last transformer winding feeding the second winding of the motor, a Thyratron-type tube, one primary winding being connected to the anode of said Thyratron-type tube, the anode of said tube being supplied with alternating current from said source through said primary winding, a condenser, the other of said primary windings being connected across said source of alternating current in series with said condenser, so as to advance the phase of the current flowing in said last primary winding, relative to the phase of the source, said second primary winding inducing currents in the first primary winding, whereby to modify the voltages applied to the anode of the Thyratron and so as to increase the peak values thereof, means for varying the magnitude and phase of the potential applied to the grid of the Thyratron, relative to the anode voltage thereon, in order to vary the magnitude and phase of the current of source frequency flowing in the first-mentioned primary winding and thereby to vary firstly, the magnitude of the combined current flowing in the secondary winding as a result of the coupling of the two primary windings therewith, and secondly, to vary the phase of the said combined current from leading to lagging with respect to the phase of the current flowing in the first motor winding.

2. Servo-mechanism according to claim 1 having a second condenser connected across the first-mentioned primary winding, in order to generate a sub-harmonic of the source frequency, whereby to give a positive alternating torque to the motor rotor when the current flowing in the two windings thereof are substantially in phase with one another, in order to overcome stiction.

GEORGE BRIGGS.

REFERENCES CITED

The following references are of record in the file of this patent:

UNITED STATES PATENTS

| Number | Name | Date |
| --- | --- | --- |
| 2,439,963 | Harrison | May 30, 1944 |
| 2,358,103 | Ryder | Sept. 12, 1944 |
| 2,411,357 | Bertram | Nov. 19, 1946 |
| 2,414,430 | Nisbet | Jan. 14, 1947 |
| 2,455,610 | Schmidt | Dec. 7, 1948 |